United States Patent Office 3,376,372
Patented Apr. 2, 1968

3,376,372
PROCESS OF FORMING CLOSURE SEALS
Don Raymond Kuespert, Wilmington, Del., assignor to
E. I. du Pont de Nemours and Company, Wilmington,
Del., a corporation of Delaware
No Drawing. Filed July 27, 1964, Ser. No. 385,501
3 Claims. (Cl. 264—268)

ABSTRACT OF THE DISCLOSURE

A process for forming closure seals for use in sealing containers of liquids and gases under pressure, which process comprises introducing into a closure structure a comminuted solid mixture comprising a highly-gelled elastomer and pressing said solid mixture with an opposed surface under at least about 50 p.s.i. pressure for about 2 to 10 seconds at a temperature between about 125° to 225° C. to form a solid pad.

---

This invention relates to closure seals and more particularly to the preparation of closure seals from elastomeric materials.

Cap seals for bottles or cans usually contain a sealing gasket of a resilient material such as cork, polyvinylchloride, polyethylene, natural rubber, polytetrafluoroethylene, etc., the choice of which usually depends on the nature of the contents, the retained pressures, and cost. Mainly because of the latter feature, cork seals have been widely used for many years. With the present trend toward packaging beverage materials with greater amounts of carbonation and therefore under higher pressure, and to package many new materials which can swell or otherwise attack certain gasket materials, and to use a variety of pressurizing gases which facilitate removal of the contents from the container, sealing materials which offer improvements over cork or plastics are constantly being sought. Plastic materials are often used for closure gaskets, but they are somewhat erratic in their performance, for example, under the high-speed application used in the packaging industry, plastic materials may be too stiff to seal properly, and sometimes develop leaks under pressure. Furthermore, when the sealed containers are stored under heat and pressure, the sealants sometimes flow out and break the seal in this way. Vulcanized elastomers such as natural rubber have been proposed for closure seal gaskets, but, again, they are not generally used because of cost and because the time needed to vulcanize to an elastic state is too long for modern high-speed packaging technology.

It has been found that closure seals can be formed which have elastic properties which enable them to recover from deformation and to resist flow while under deformation by a process which comprises introducing into a closure structure a comminuted solid mixture comprising a highly-gelled elastomer, and pressing the mixture with an opposed surface under at least about 50 pounds per square inch pressure, for about 2 to 10 seconds at a temperature between about 125° to 225° C., to form a solid pad.

The elastomeric compositions which can be used in this invention must be capable of substantial recovery from deformation at room tempertaure (i.e., about 20° C.). "Substantial recovery" means a recovery greater than about 40% according to the test method defined in Example 1. Such elastomers are "highly-gelled" elastomers characterized by a high proportion of insoluble gel polymer. For example, a polychloroprene elastomer is highly-gelled elastomer when it contains over 40%, preferably 80–95%, of gel polymer. Styrene-butadiene rubber is highly-gelled when it contains above 30%, preferably 40–50%, gel polymer.

A preferred elastomer is polychloroprene which can be prepared by the method described in U.S. Patent No. 2,505,226. The styrene-butadiene copolymers useful in the process of the invention are those which contain less than 50% bound styrene monomer units, preferably from about 20% to 30%. They may be prepared by conventional polymerization processes well known in the art. A preferred type is made by the so-called "cold polymerization process" and is commercially designated as SBR 1500. Both the elastomers have molecular weights in excess of 5000.

The sealing compositions containing polychloroprene or blends of polychloroprene and styrene butadiene copolymers can be prepared readily by combining the compounding ingredients on a cool rubber mixing mill according to conventional technology. In preparing sealing compositions containing the styrene-butadiene copolymers, without the polychloroprene, it is preferred to heat the polymers alone or with the compounding ingredients, for about 5 to 25 minutes at temperatures of 135° C. to 190° C. which increases the recovery from deformation.

The elastomeric compositions are then prepared for processing in a seal structure by forming them into powders, coarsely chopped lumps or sheets of suitable thickness. Particles ground to about 1/16 in. size are convenient and preferred for easy proportioning. Size of the particles is not critical so long as they are small enough to coalesce under the pressure and temperature conditions used in the packaging equipment. Blends of the elastomeric particles and ground cork particles may also be used to prepare seals. When these blends are used, the time and temperature of molding must be adequate to coalesce the elastomeric particles, but not so extreme as to decompose the cork.

The invention will now be described with reference to the following examples of specific embodiments thereof wherein parts and percentages are by weight unless otherwise specified.

EXAMPLE 1

A polychloroprene composition is prepared by milling the following ingredients together on a cool two-roll rubber mill, according to the proportions below.

| | |
|---|---|
| Polychloroprene (of U.S. Patent 2,505,226) | 100.0 |
| Anhydrous sodium acetate | 0.5 |
| Phenolic antioxidant | 1.0 |
| Zinc oxide | 5.0 |
| Magnesium oxide | 4.0 |
| Clay | 100.0 |

The composition is removed as a sheet from the mill, and is subsequently ground in liquid nitrogen to provide randomly distributed particles of "powder" which are of sizes such that they will pass through a No. 5 screen, but not through a No. 230 screen (U.S. Standard). Into a plunger-type, single-cavity mold containing a cavity about 1⅛ inches in diameter there is introduced sufficient "powder" to form a disc about 0.04 inch thick. The powder is compressed in the mold for about 3 seconds at a temperature about 204° C. under a pressure of 1182 pounds per square inch, then removed from the mold as a solid disc seal.

To test the recovery of the disc seal produced, several of the discs are superimposed to provide a test structure about ½ inch high and about 1⅛ inches in diameter. This structure is then compressed between parallel plates under a load sufficient to cause a 25% deflection in height. The compressed srtucture is held in this position for 22 hours at room temperature, then it is removed from between the plates and free recovery is permitted for about 30 minutes. The height of the structure is then measured and the recovery from the deformation is calculated as 59%, according to the relationship: percent recovery=100−C, where C is the value for percent compression set shown in ASTM test designation D–395–61.

EXAMPLE 2

A blended composition is prepared by milling the following ingredients together on a cool two-roll rubber mill according to the proportions shown.

| | |
|---|---|
| Polychloroprene (of U.S. Patent 2,505,226) | 66.0 |
| Styrene-butadiene rubber (SBR–1500 type) | 33.0 |
| Phenolix antioxidant | 1.0 |
| Zinc oxide | 5.0 |
| Magnesium oxide | 2.0 |
| Clay | 100.0 |

The composition is ground according to the procedure of Example 1, and discs are molded following the procedure of Example 1. A test structure about ½″ high and about 1⅛″ in diameter is formed and tested according to the procedure of Example 1. The recovery from deformation is about 48%.

EXAMPLE 3

A composition containing butadiene-styrene copolymer is prepared by milling the polymer for 15 minutes at 177° C. on a two-roll rubber mill, then adding the remaining ingredients on a cool two-roll rubber mill according to the proportions shown.

| | |
|---|---|
| Styrene-butadiene copolymer (SBR–1500 type) | 100.0 |
| Phenolic antioxidant | 1.0 |
| Zinc oxide | 5.0 |
| Clay | 100.0 |

The procedures described in Example 1 are then followed. The recovery from deformation is about 55%.

While the invention has been described with reference to specific polychloroprenes and styrene-butadiene copolymers, it is believed that any highly-gelled hydrocarbon elastomer exhibiting satisfactory recovery from deformation can be formed into a useful seal according to the process of this invention. Representative of such are polybutadiene, polyisoprene, and copolymers of ethylene and propylene. These can be compounded according to known techniques and used in accordance with the above examples to form closure seals.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. The process for forming closure seals for use in sealing containers of liquids and gases under pressure, which process comprises introducing into a closure structure a comminuted solid mixture comprising a highly-gelled elastomer capable of substantial recovery from deformation selected from the group consisting of polychloroprene, styrene-butadiene copolymer, and blends thereof, and pressing said solid mixture with an opposed surface under about 500 to 1500 p.s.i. pressure for about 2 to 10 seconds at a temperature between about 125° to 225° C. to form a solid pad.

2. A procss as defined in claim 1 wherein said elastomer is polychloroprene.

3. A process as defined in claim 1 wherein said elastomer is a blend of polychloroprene and styrene-butadiene copolymer.

References Cited

UNITED STATES PATENTS

| | | | |
|---|---|---|---|
| 2,663,909 | 12/1953 | Maier et al. | 264—268 |
| 2,749,266 | 6/1956 | Eldred | 264—137 |

FOREIGN PATENTS

| | | |
|---|---|---|
| 10,621 | 5/1909 | Great Britain. |

ROBERT F. WHITE, *Primary Examiner.*

T. J. CARVIS, *Assistant Examiner.*